(No Model.)
J. W. DOWNEY.
FRUIT PICKER.
No. 595,531. Patented Dec. 14, 1897.
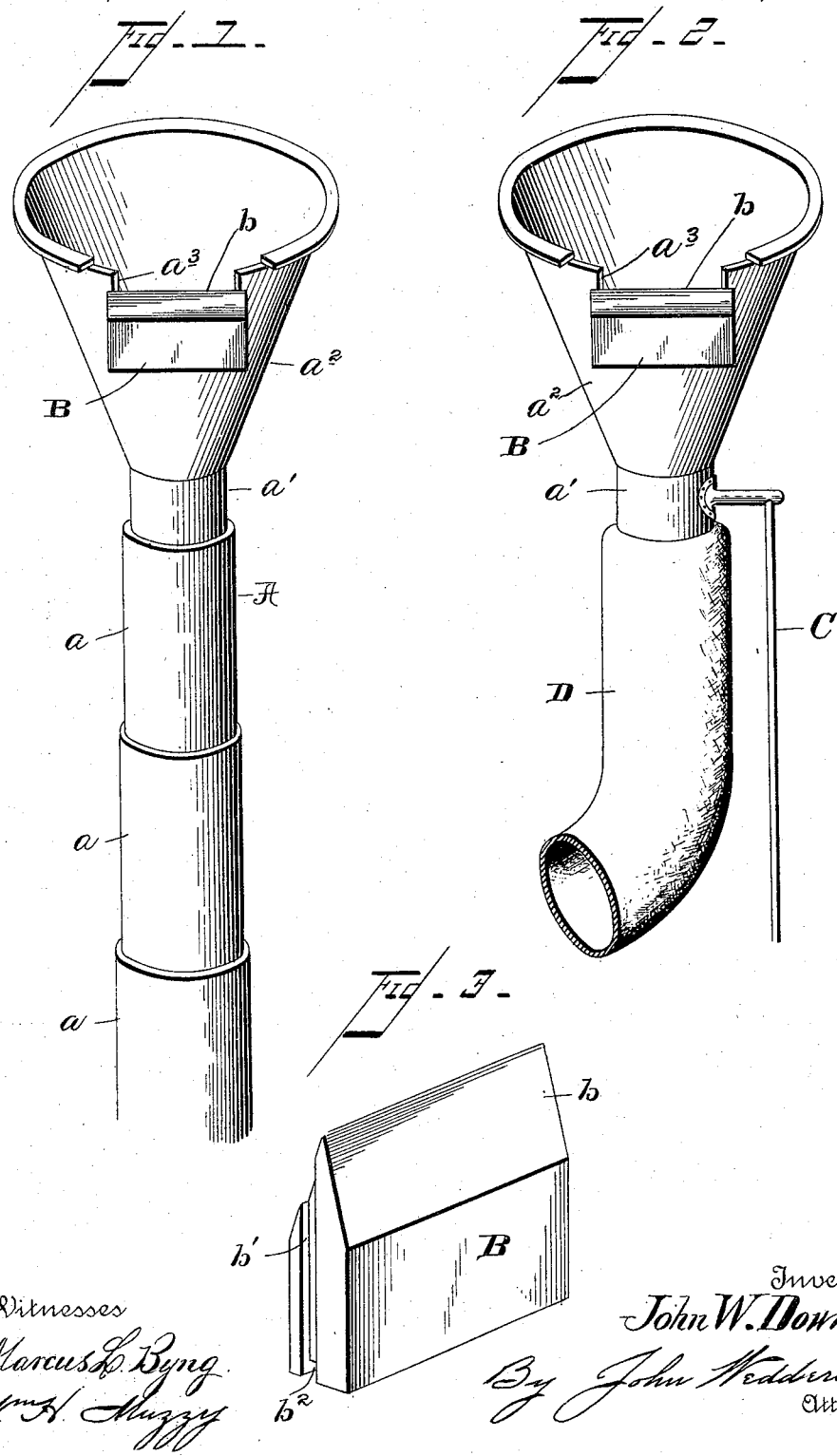
Witnesses
Marcus L. Byng
Wm H. Muzzy
Inventor
John W. Downey
By John Wedderburn
Attorney

UNITED STATES PATENT OFFICE.

JOHN W. DOWNEY, OF EDGEWOOD PARK, PENNSYLVANIA.

FRUIT-PICKER.

SPECIFICATION forming part of Letters Patent No. 595,531, dated December 14, 1897.

Application filed December 7, 1896. Serial No. 614,855. (No model.)

*To all whom it may concern:*

Be it known that I, JOHN W. DOWNEY, a citizen of the United States, residing at Edgewood Park, in the county of Allegheny and State of Pennsylvania, have invented certain new and useful Improvements in Fruit-Pickers; and I do hereby declare the following to be a full, clear, and exact description of the invention, such as will enable others skilled in the art to which it appertains to make and use the same.

The invention relates to improvements in fruit-picking devices; and it consists of certain novel constructions, which will be hereinafter more particularly set forth and claimed.

In the accompanying drawings, forming part of this specification, Figure 1 represents a perspective view of a device embodying my invention. Fig. 2 represents a modified form of the same, and Fig. 3 represents an enlarged detail perspective view of the detachable knife.

A in the drawings represents the metallic tube, and B the cutting-knife. The said tube A is preferably constructed of tin formed in a plurality of sections $a\, a$, detachably secured together at their ends, so as to fit snugly one within the other. The upper section $a'$ is formed with a flaring funnel-shaped end $a^2$, in the side of which is cut a recess $a^3$. The movable cutting-knife B, having a sharp upper cutting edge $b$ and side and bottom grooves $b'$ and $b^2$, is applied in said recess $a^3$ by being slipped down over the walls of the same, said walls entering the said grooves and thus firmly holding the knife in position.

It will be observed from the foregoing description that when it is desired to remove the fruit from a tree the operator stands below said tree and forces the knife B upward against the stem of the fruit, thus severing said stem and causing the fruit to fall into the flaring mouth $a^2$ and from thence descend down through the body of the chute or tube A into the hand of the operator, who then passes the fruit into a suitable basket. It will thus be observed that the fruit may be delicately picked without any liability of bruising the same by simply applying said knife right up against the stems, being careful that the flaring mouth $a^2$ of the chute is directly under the severed fruit.

By making the sections of the chute detachable the same may be conveniently stored away when not in use, and may also be adjusted to the desired height according to the character of tree to be operated upon, a greater number of sections being employed if the tree is of more than ordinary height, and vice versa if the tree is below the medium.

In the modified construction of my invention shown in Fig. 2 I provide the upper flaring section $a'$ with a supporting rod or handle C, adapted to be grasped by the operator. I also form the chute of the continuous tube D of canvas or other flexible material, secured to the lower end of the flaring mouth-section $a'$. This form of construction is sometimes desirable when the picking device must be used at an angle, so that the fruit when rolling down the chute or tube will not become bruised by contacting with the sides of the same. This form of my device may also readily be folded into a very compact form by simply doubling back the flexible tube against the section $a'$.

Having thus described my invention, what I claim as new, and desire to secure by Letters Patent, is—

In a fruit-picking device, the combination with a chute having a rigid flaring mouth at its upper end formed with a rectangular knife-receiving recess, of a knife having grooves formed in its ends and bottom and adapted to be slipped down into the knife-recess, so that the walls of the same enter said grooves, and means for supporting the chute in position, substantially as described.

In testimony whereof I have signed this specification in the presence of two subscribing witnesses.

JOHN W. DOWNEY.

Witnesses:
ANDREW DOWNEY,
JACOB BEAVERS.